US011199169B1

United States Patent
Namuduri et al.

(10) Patent No.: US 11,199,169 B1
(45) Date of Patent: Dec. 14, 2021

(54) APPARATUS AND METHOD FOR ENGINE STOP POSITION CONTROL

(71) Applicant: GM Global Technology Operations LLC, Detroit, MI (US)

(72) Inventors: Chandra S. Namuduri, Troy, MI (US); Suresh Gopalakrishnan, Troy, MI (US); Pranjal Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/236,449

(22) Filed: Apr. 21, 2021

(51) Int. Cl.
*F02N 11/08* (2006.01)
*F02N 5/04* (2006.01)
*F02N 15/06* (2006.01)
*F02N 19/00* (2010.01)

(52) U.S. Cl.
CPC ............ *F02N 11/0855* (2013.01); *F02N 5/04* (2013.01); *F02N 11/0814* (2013.01); *F02N 11/0844* (2013.01); *F02N 15/062* (2013.01); *F02N 2019/008* (2013.01); *F02N 2200/021* (2013.01); *F02N 2200/022* (2013.01); *F02N 2200/044* (2013.01); *F02N 2300/108* (2013.01)

(58) Field of Classification Search
CPC ............ F02N 11/0814; F02N 11/0844; F02N 11/0855; F02N 2200/021; F02N 2200/022; F02N 2300/108; F02N 2019/008

USPC ............................................ 123/179.3, 179.4
See application file for complete search history.

(56) References Cited

U.S. PATENT DOCUMENTS

| 8,299,639 | B2 * | 10/2012 | Usami ................... F02N 15/067 290/38 R |
| 10,473,081 | B1 | 11/2019 | Hao et al. |
| 10,677,212 | B2 * | 6/2020 | Gopalakrishnan .... F02N 19/005 |
| 2010/0083926 | A1 * | 4/2010 | Okumoto .................. H02P 1/10 123/179.4 |
| 2019/0338744 | A1 | 11/2019 | Namuduri et al. |
| 2021/0017943 | A1 | 1/2021 | Samie et al. |

* cited by examiner

*Primary Examiner* — Erick R Solis
(74) *Attorney, Agent, or Firm* — Vivacqua Crane, PLLC

(57) ABSTRACT

An electric starter system for an internal combustion includes a pinion gear, a pinion solenoid coupled to the pinion gear, a starter motor that is selectively connectable to the flywheel of the engine via the pinion gear, and a controller in communication with the pinion solenoid and the starter motor. In response to an engine auto-stop signal, the controller is configured to translate the pinion gear into contact with the flywheel and the motor, and cause rotation of the engine crankshaft to a predetermined crank angle. In response to an engine auto-start signal, the controller is configured to command delivery of motor torque from the starter motor, through the pinion gear, and to the flywheel for a duration sufficient for starting the engine.

20 Claims, 3 Drawing Sheets

APPARATUS AND METHOD FOR ENGINE STOP POSITION CONTROL

INTRODUCTION

The present disclosure relates to an apparatus and method for an engine stop-start system, as may be used in a vehicle powertrain.

An internal combustion engine typically uses an electric starter motor to turn the engine crankshaft to initiate combustion in the engine when the engine is started from a stopped state. In some vehicle applications, a start-stop system is used, where the engine is automatically shut off (referred to herein as an auto-stop event) when vehicle propulsion is not required to conserve fuel, and automatically restarted (referred to herein as an auto-start event) when vehicle drive torque is required. Such automatic stops and restarts may result in noise, vibration, and harshness (NVH) concerns perceived by the vehicle occupants.

Thus, while current start-stop systems achieve their intended purpose, there is a need for a new and improved system and method for start-stop operation of a vehicle engine.

SUMMARY

According to several aspects, an electric starter system for an internal combustion engine having a flywheel with a flywheel gear, the flywheel connected to an engine crankshaft is disclosed. The electric starter system includes a pinion gear, a pinion solenoid device coupled to the pinion gear, a starter motor that is selectively connectable to the flywheel of the engine via the pinion gear, and a controller in communication with the pinion solenoid device and the starter motor. The controller is configured to, in response to an engine auto-stop signal, command the engine to turn off and determine an engine speed of the engine after being turned off. In response to the engine speed being less than a first threshold speed, the controller is configured to command that a control current be delivered to the pinion solenoid device at a peak current level to thereby translate the pinion gear into contact with the flywheel and the motor. In response to the engine speed being less than a second threshold speed, the controller is configured to supply pulse width modulation (PWM) excitation to the starter motor to cause rotation of the starter motor to thereby fully engage the pinion gear with the flywheel and to cause rotation of the engine crankshaft to a predetermined crank angle and to cease supplying PWM excitation to the starter motor when the engine crankshaft has reached the predetermined crank angle. The controller is further configured to transmit pulse width modulation (PWM) pinion control signals at varying voltages to deliver the control current to the pinion solenoid device at a fluctuating holding current level after the pinion gear is fully engaged with the flywheel, the holding current level being a non-zero value less than the peak current level. In response to an engine auto-start signal, the controller is configured to command delivery of motor torque from the starter motor, through the pinion gear, and to the flywheel while maintaining the control current at the holding current level for a duration sufficient for starting the engine.

In an additional aspect of the present disclosure, the electric starter system includes two independently controllable devices for delivering current to the starter motor.

In another aspect of the present disclosure, one of the two independently controllable devices for delivering current to the starter motor includes a motor solenoid, and the other of the two independently controllable devices for delivering current to the starter motor includes a semiconductor switching device.

In a further aspect of the present disclosure, the pulse width modulation (PWM) excitation to the starter motor is supplied by the semiconductor switching device.

In an additional aspect of the present disclosure, excitation to the starter motor to deliver motor torque from the starter motor, through the pinion gear, and to the flywheel while maintaining the control current at the holding current level for a duration sufficient for starting the engine is supplied by the motor solenoid.

In another aspect of the present disclosure, the pinion solenoid device and the starter motor are powered via an auxiliary voltage bus having a nominal voltage level of 15V or less.

According to several aspects, a method is disclosed for controlling an electric starter system for an internal combustion engine having a flywheel. The method includes commanding, responsive to an engine auto-stop signal, the engine to turn off, and determining, via a controller, when an engine speed of the engine is less than a first threshold speed. The method further includes commanding, responsive to the engine speed being less than the first threshold speed, delivery of a control current to a pinion solenoid device via the controller at a peak current level to thereby translate a pinion gear connected to the pinion solenoid device into contact with the flywheel. The method further includes commanding, responsive to the engine speed less than a second threshold speed, rotation of a starter motor to thereby fully engage the pinion gear with the flywheel and to rotate the engine crankshaft to a predetermined crank angle, and transmitting pulse width modulation (PWM) pinion control signals at varying voltages to deliver the control current to the pinion solenoid device at a fluctuating holding current level that is a non-zero value less than the peak current level, after the pinion gear is fully engaged with the flywheel. The method further includes commanding via the controller, responsive to an engine auto-start signal, delivery of motor torque from the starter motor, through the pinion gear, and to the flywheel while maintaining the control current at the holding current level and maintaining the motor torque via the controller for a duration sufficient for starting the engine.

According to several aspects, A powertrain includes an internal combustion engine having a flywheel with a flywheel gear, a transmission connected to the engine, a load coupled to the transmission, a power source configured to output electric current; a pinion gear, a pinion solenoid device coupled to the pinion gear and configured to activate in response to electric current from the power source to thereby move the pinion gear into meshing contact with the flywheel gear of the flywheel, a starter motor with a motor gear that is selectively connectable to the flywheel gear of the flywheel of the engine via the pinion gear by activating the pinion solenoid device, and a controller in communication with the pinion solenoid device and the starter motor. In response to an engine auto-stop signal, the controller is configured to command the engine to turn off, determine an engine speed of the engine after being turned off, and command, in response to the engine speed being less than a first threshold speed, a control current be delivered to the pinion solenoid device at a peak current level to thereby translate the pinion gear into contact with the flywheel and the motor. The controller is further configured to command, in response to a predetermined delay time having elapsed after beginning the delivery of the control current to the pinion solenoid device at the peak current level, pulse width modulation (PWM) pinion solenoid control signals at varying voltages to deliver the control current to the pinion solenoid device at a fluctuating holding current level, the holding current level being a non-zero value less than the peak current level. In response to the engine speed being less than a second threshold speed, the controller is further configured to command pulse width modulation (PWM) motor control signals be delivered to the starter motor to cause rotation of the starter motor to thereby fully engage the pinion gear with the flywheel and to cause rotation of the engine crankshaft to a predetermined crank angle, and to cease transmitting PWM motor control signals to the starter motor when the engine crankshaft has reached the predetermined crank angle. In response to an engine auto-start signal, the controller is configured to command delivery of motor torque from the starter motor, through the pinion gear, and to the flywheel while maintaining the control current at the holding current level for a duration sufficient for starting the engine.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
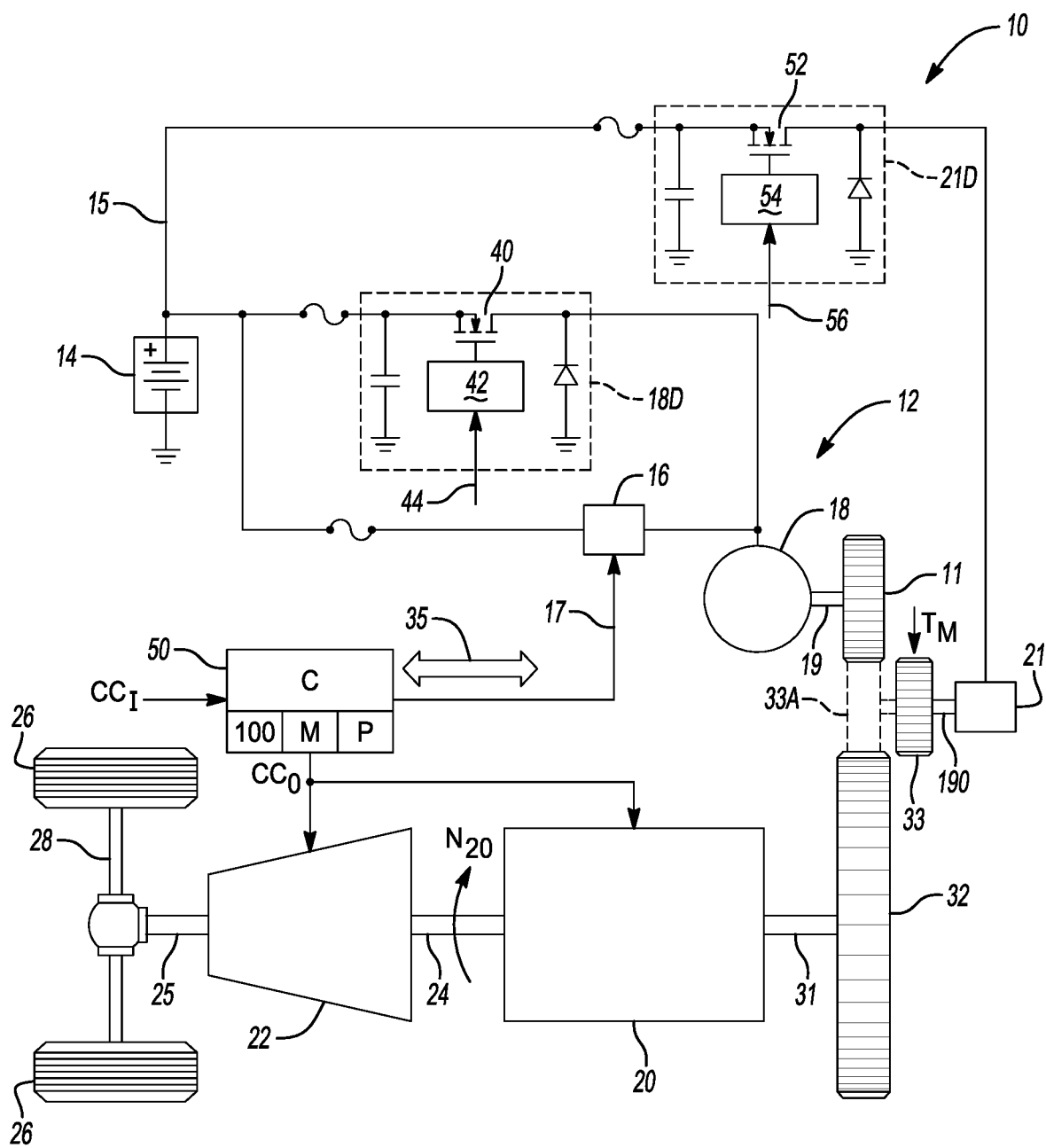
FIG. 1 is a schematic illustration of an example electric starter system for an engine.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The following description is merely exemplary in nature and is not intended to limit the present disclosure, application, or uses.

Referring to the drawings, wherein like reference numbers refer to the same or like components in the several Figures, an example powertrain 10 is shown schematically in FIG. 1 having an engine 20 coupled via a crankshaft 31 to a flywheel 32, e.g., to a ring gear or other drive mechanism connected thereto. The powertrain 10 also includes an electric starter system 12 operable for automatically cranking and starting the engine 20 during an engine auto-start event, for instance after the engine 20 has been turned off at idle. The electric starter system 12 may include or may be connected to a direct current (DC) battery pack 14, e.g., a multi-cell lithium ion, nickel metal hydride, or lead acid battery pack having positive (+) and negative (−) terminals.

The battery pack 14 may be an auxiliary battery pack, e.g., having a nominal voltage at auxiliary levels, e.g., about 12-15 VDC.

The electric starter system 12 as disclosed herein includes a permanent magnet brush motor, hereinafter referred to as starter motor 18. The starter motor 18 provides cranking torque in support of a start-stop function of the engine 20. The starter motor 18 includes a rotor 19 coupled to a gear system 11, which by way of a non-limiting example may comprise a planetary gear system. The electric starter system 12 also includes a pinion solenoid device 21 coupled to a pinion gear 33 via a shaft 190, with the pinion gear 33 able to be selectively engaged with the flywheel 32 via operation of the solenoid device 21.

As explained in further detail below with reference to FIGS. 2 and 3, a controller 50, such as an engine control module in an exemplary vehicle embodiment, is configured to execute a method 100 in the overall control of a torque operation of the starter motor 18. This occurs both during and after an auto-start event of the engine 20. Rather than using a permanently-engaged starter motor with a one-way clutch disposed between the crankshaft 31 and flywheel 32, such that one member is continuously rotating with the engine 20, the present approach instead employs separate solenoids which are used to control a pinion gear and to energize a brush-type starter motor within the electric starter system 12. As such, the present approach enables reduced power operation and extended periods of engagement of the pinion gear 33 with the flywheel 32 during auto-stop/start events of the engine 20.

In particular, the controller 50 executes logic embodying the method 100 as part of a pinion pre-engagement scheme when the engine 20 is in an auto-stop mode and engine speed ($N_{20}$) is below a calibrated threshold speed. The controller 50 controls a pinion solenoid driver circuit 21D to provide electrical current to the pinion solenoid device 21. The pinion solenoid driver circuit 21D includes a first semiconductor switching device 52, depicted as a MOSFET whose on-off state is controlled by a first gate driver circuit 54 in response to a pinion solenoid control signal 56 from the controller 50. When the pinion solenoid device 21 is energized, the pinion gear 33 is engaged with the flywheel 32, and thus with the engine 20, until a commanded restart operation of the engine 20 using the starter motor 18 is complete. After a predetermined duration, the controller 50 reduces a level of voltage or current that is supplied to the pinion solenoid device 21, such as via pulse width modulation (PWM) or other suitable electronic switching control technique. In this manner, the controller 50 holds the pinion gear 33 in meshed engagement with the flywheel 32, e.g., with a splined or toothed gear member connected thereto, without overheating the pinion solenoid device 21. While depicted as a MOSFET, it will be appreciated that the first semiconductor switching device 52 may be implemented as another type of semiconductor device, e.g. an IGBT, a GaN FET, or a SiC MOSFET with an appropriate first driver circuit 54, without departing from the spirit and scope of the disclosure.

With continued reference to FIG. 1, the depicted exemplary embodiment includes two controllable sources for drive voltage or current to the starter motor 18. The electric starter system 12 may include a motor solenoid device 16, which is configured to electrically connect the battery pack 14 to the permanent magnet DC brush motor 18. A motor solenoid control signal 17 from the controller 50 allows the controller 50 to set the on-off state of the starter motor 18. While shown separately from the starter motor 18 for illustrative clarity, the motor solenoid device 16 and starter motor 18 may be an integrated assembly. The embodiment shown in FIG. 1 further includes a motor driver circuit 18D electrically connected to the starter motor 18. The motor driver circuit 18D includes a second semiconductor switching device 40, depicted as a MOSFET, whose on-off state is controlled by a second gate driver circuit 42 in response to a motor command signal 44 from the controller 50. Motor torque (arrow $T_M$) from the starter motor 18 is used to control rotation of the pinion gear 33 in a manner that ensures full seating of the pinion gear 33 on the gear system 11, as well as advancing the engine crank position to a desired crank angle to reduce the time required to restart the engine in an auto-start event. The controller 50 may control a motor voltage or current to advance the motor 18 to the desired crank angle by providing a PWM motor command signal 44. In this manner, the approach described herein is intended to help eliminate noise, vibration, and harshness due to suboptimal gear meshing during the auto-start event. While depicted as a MOSFET, it will be appreciated that the second semiconductor switching device 40 may be implemented as another type of semiconductor device, e.g. an IGBT, a GaN FET, or a SiC MOSFET with an appropriate second driver circuit 42, without departing from the spirit and scope of the disclosure.

Further with respect to the powertrain 10 and electric starter system 12 shown in FIG. 1, the engine 20 may be embodied as a gasoline or diesel engine, and ultimately outputs engine torque to an output shaft 24. The output shaft 24 may be coupled to a transmission 22, e.g., via a hydrodynamic torque converter or clutch (not shown). The transmission 22 ultimately delivers output torque at a particular gear or speed ratio to a transmission output member 25. The output member 25 in turn drives a coupled load via one or more drive axles 28, with the load depicted in FIG. 1 being a set of drive wheels 26 in an example automotive application. Other beneficial applications for the powertrain 10 may be envisioned, including power plants, robotics, mobile platforms, and non-motor vehicle applications such as watercraft, marine vessels, rail vehicles, and aircraft, and therefore the motor vehicle embodiment of FIG. 1 is intended to be illustrative of the disclosed concepts without limitation.

When the engine 20 is not running, such as after a fuel-conserving auto-stop event of the engine 20 at idle or when cruising with the engine 20 turned off, the electric starter system 12 may be electrically and automatically energized in response to an auto-start command from the controller 50 to selectively deliver starting motor torque (arrow $T_M$) to the flywheel 32. One possible configuration for achieving such ends is the use of the pinion solenoid device 21 situated as depicted in FIG. 1. The pinion solenoid device 21 may include the shaft 190, possibly with a lever (not shown) located between the shaft 190 and the pinion solenoid device 21.

When the pinion solenoid device 21 is energized in response to the pinion solenoid control signal 56 from the controller 50, the pinion solenoid device 21 linearly translates the pinion gear 33 to the position indicated at 33A, and thus into direct contact and meshed engagement with mating teeth or splines on both the flywheel 32 and the gear system 11. Once the engine 20 has started, the pinion solenoid control signal is set to a state to de-energize the pinion solenoid device 21. The pinion gear 33 is then urged out of engagement with the flywheel 32 via a return action of the pinion solenoid device 21. Other configurations may exist for selectively engaging the pinion gear 33 with the flywheel 32 and gear system 11, and therefore the illustrated embodiment is intended to be illustrative of the general concepts disclosed herein without limiting the electric starter system 12 to such an embodiment.

Thus, in a vehicular embodiment of the powertrain 10 the pinion solenoid device 21 may be powered by PWM voltage controlled by the controller 50. The controller 50 may be electrically connected to the pinion solenoid device 21 and the starter motor 18 over separate control lines in a possible embodiment, with each control line possibly having a voltage level up to the voltage level of the battery 14.

The controller 50 of FIG. 1 is configured to receive measured voltage, current, position, temperature, and/or other suitable electrical value as part of a set of input signals (arrow $CC_I$). The controller 50 may be variously implemented as one or more control devices collectively managing the motor torque (arrow $T_M$) from the starter motor 18 as part of the method 100. The controller 50 is configured to control the pinion solenoid device 21 via the pinion solenoid control signal 56 and, at the same time, enable and energize the starter motor 18 via motor solenoid control signal 17, with the pinion solenoid control signal 56 and motor solenoid control signal 17 possibly being transmitted over separate control lines or transfer connectors. As a result, the pinion solenoid device 21 may be supplied with a PWM voltage signal to enable soft/low-noise engagement and holding currents that help maintain the pinion gear 33 in a meshed pre-engaged state during an auto-stop condition.

Multiple controllers may be in communication via a serial bus, e.g., the CAN bus 35, other differential voltage networks, or via discrete conductors. The pinion solenoid device 21 may be responsive to a pinion solenoid driver circuit 21D, which may reside in the controller 50 or the starter motor 18 in different embodiments.

The controller 50 may include one or more digital computers each having a processor (P), e.g., a microprocessor or central processing unit, as well as memory (M) in the form of read only memory, random access memory, electrically-programmable read only memory, etc., a high-speed clock, analog-to-digital and digital-to-analog circuitry, input/output circuitry and devices, and appropriate signal conditioning and buffering circuitry. The controller 50 may also store algorithms and/or computer executable instructions in memory (M), including the underlying algorithms or code embodying the method 100 described below, and transmit commands to the electric starter system 12 to enable performance of certain control actions according to the present disclosure.

The controller 50 is in communication with the engine 20 and receives, as part of the input signals (arrow $CC_I$), signals indicative of a speed and temperature of the engine 20, as well as other possible engine operating conditions or parameters. Such parameters include a starting request of the engine 20, whether operator-initiated or autonomously generated. The controller 50 is also in communication with the starter motor 18, and thus receives signals indicative of current speed, current draw, torque, temperature, and/or other operating parameters. The controller 50 may also communicate with the battery pack 14 and receive signals indicative of a battery state of charge, temperature, and current draw, as well as a voltage across the DC voltage bus 15. In addition to transmitting a torque request to the starter motor 18 via the motor solenoid control signal 17, the controller 50 may also transmit output signals (arrow $CC_O$) to the engine 20 and transmission 22 as part of the overall operating function of the controller 50.

Figure 2:
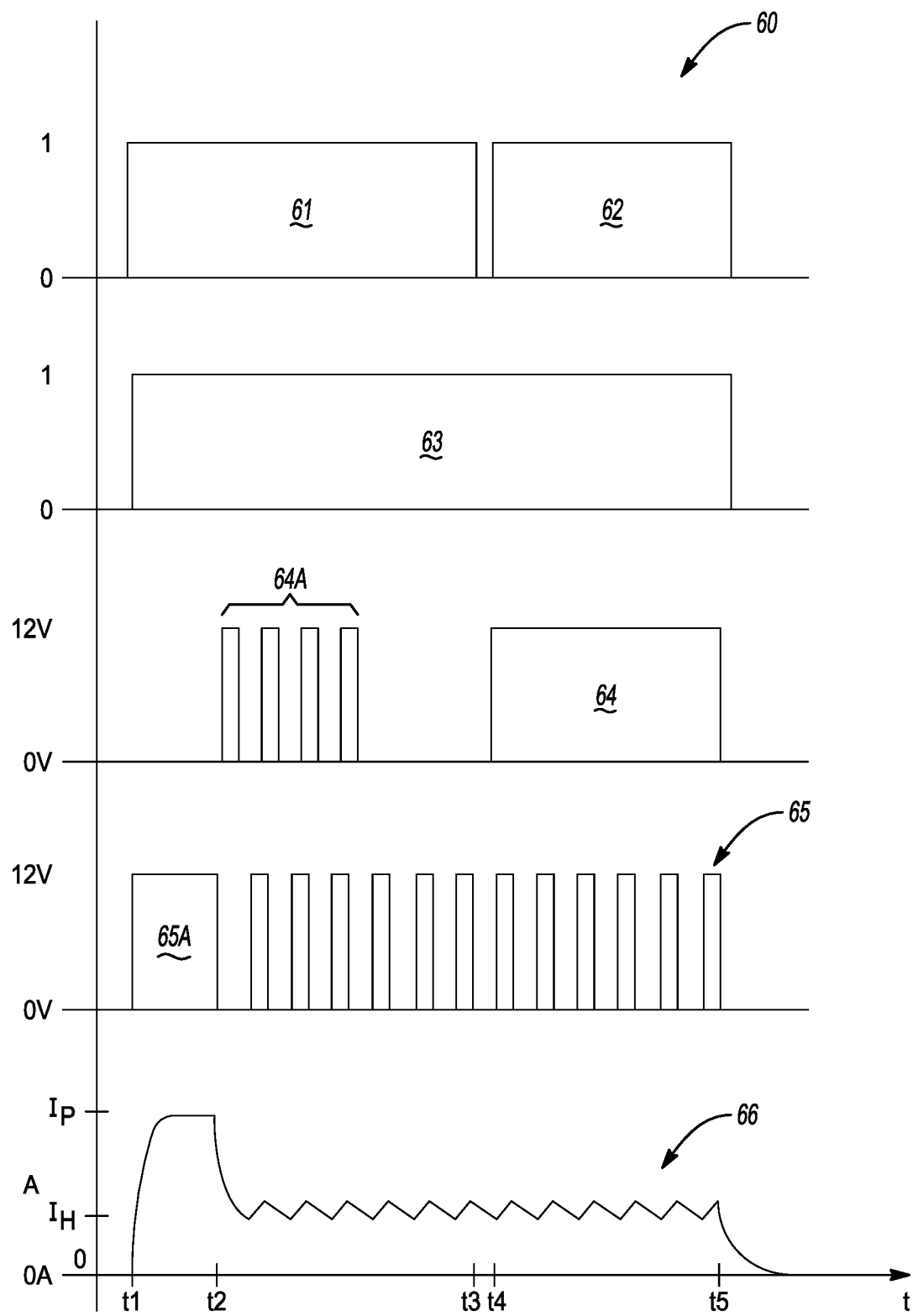
FIG. 2 is a time plot of various bit flags and nominal control values usable in the overall control of the electric starter system shown in FIG. 1.

Referring to traces 60 of FIG. 2, as part of the method 100 the controller 50 is configured to set an engine start flag, e.g., a binary 1 or 0 bit flag, to enable the starter motor 18 and the pinion solenoid device 21 to be controlled in a subsequent engine start event after an auto-stop condition. Control parameters evaluated as part of the method 100 may include bit flags 61 and 62. Bit flag 61 of FIG. 2 corresponds to an active auto-stop condition in which the engine 20 of FIG. 1 is in an off state, i.e., is not running, and engine speed ($N_{20}$) is less than a threshold speed. This condition extends from about t1 to t3 in FIG. 2. Bit flag 62 is then sent high, e.g., to binary 1 as shown, when the controller 50 commands restart of the engine 20, which commences at t4 and continues until t5.

At t1, the controller 50 sets another bit flag 63 indicating that pre-engagement of the pinion gear 33 is enabled in logic of the controller 50. This pinion-enabled state continues until completion of the restart event at t5. Thus, bit flags 61, 62, and 63 correspond to TRUE/FALSE logic states in which a high value (e.g., 1) is TRUE and a low value (0) is FALSE.

At t2, which is reached shortly after enabling the pinion solenoid device 21, the controller 50 also enables energizing of the starter motor 18, as indicated by motor voltage traces 64A and 64 which vary between 0V and 12V in a nominal 12V auxiliary embodiment of the DC voltage bus 15 shown in FIG. 1. As indicated by the portion of FIG. 2 labeled 64A, the starter motor 18 is alternately energized and deenergized with a PWM voltage for an interval of time starting at t2. In an exemplary embodiment, PWM drive to the starter motor 18 is provided by the motor driver circuit 18D in FIG. 1, with a PWM signal provided as the motor command signal 44.

FIG. 2 also shows PWM voltages 65A and 65 which vary between 0V and 12V in a nominal 12V auxiliary embodiment of the DC voltage bus 15 shown in FIG. 1. Thus, between t1 and t2 at an initial pre-engagement of the pinion solenoid device 21 prior to enabling the starter motor 18, the full bus voltage is delivered to the pinion solenoid device 21, as indicated by the initial PWM voltage 65A. PWM voltage 65A is sufficient to cause the pinion gear 33 to overcome friction and begin to move. Between t2 and t5, the controller 50 of FIG. 1 controls the pinion solenoid device 21 at a lower voltage level, and thus with reduced power, as indicated by the significantly shorter duration or duty cycle of each pulse of the PWM voltage 65 relative to the initial PWM voltage 65A.

Responsive to the PWM voltages 65A and 65 is an actual coil current 66 describing the current, in amps, that is delivered to the pinion solenoid device 21. Coil current 66 initially ramps up to a peak current ($I_P$) at t2 before settling to a lower holding current ($I_H$) shortly after t2. Sustaining the holding current ($I_H$) from t2 until t5 ultimately reduces power consumption, with PWM voltage 65 thereafter used to hold the pinion gear 33 of FIG. 1 in an engaged state without overheating the pinion solenoid device 21.

As noted above with reference to FIG. 1, the pinion solenoid device 21 may be supplied by the controller 50 with a PWM voltage at a level that enables soft engagement of the pinion gear 33 with the flywheel 32 during an auto-stop condition of the engine 20. The on-duration and movement of the starter motor 18 during the auto-stop phase may be controlled by applying the PWM voltage 64A to complete full seating of the pinion gear 33 on the gear system 11 of FIG. 1 and to advance the engine to a desired crank angle. Delivery of the PWM voltage 64A may be achieved by applying a desired PWM signal as the motor command signal 44 to the motor driver circuit 18D. During restart of the engine 20, the motor solenoid device 16 is controlled to deliver maximum power as shown by voltage trace 64 to the starter motor 18 for restart with minimal delay, as the pinion gear 33 is already in a fully seated position with respect to the gear system 11. Once the engine 20 has fully restarted, the controller 50 terminates the engine start signal at about t5 of FIG. 2, as shown via bit flag 62, with the pinion solenoid device 21 de-energized at the same time. The controller 50 also terminates the motor solenoid control signal 17 when motor speed reaches a pre-determined value or when the engine start signal is terminated, whichever comes first. The starter motor 18 is then shut down. The pinion solenoid coil current (trace 66) thereafter decays to zero.

Figure 3:
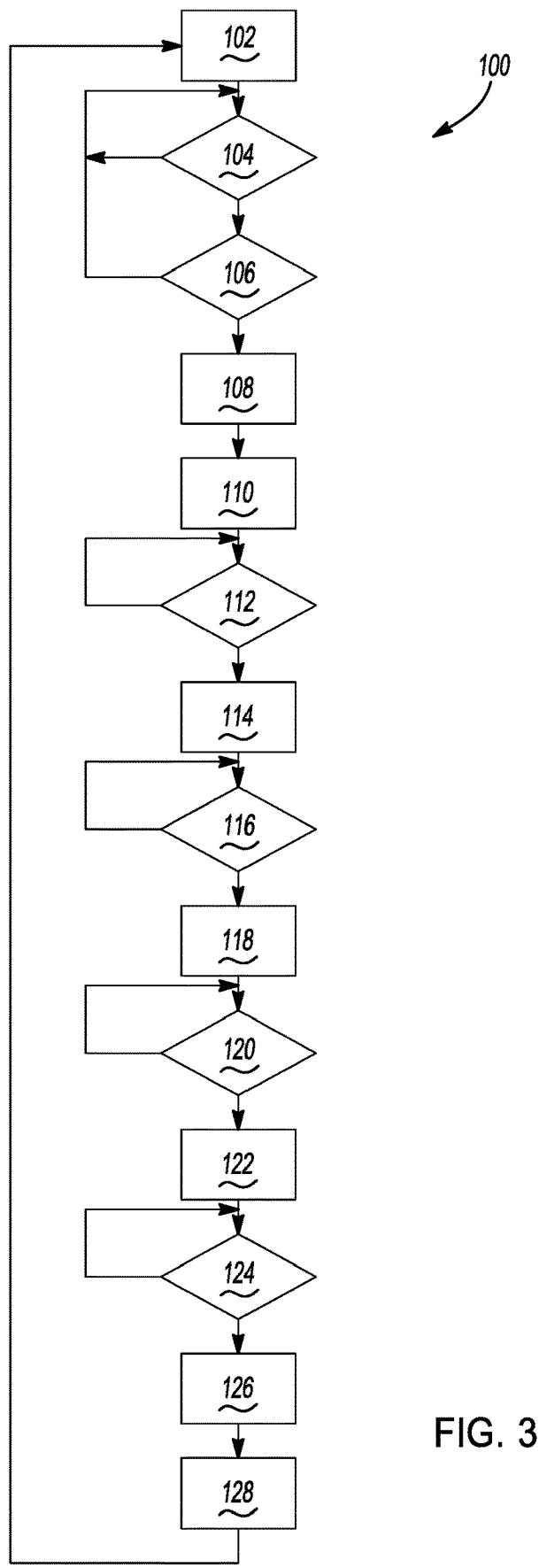
FIG. 3 is a flow chart describing an example embodiment of a method for controlling pre-engagement of the pinion gear and engine crank angle in the electric starter system of FIG. 1 during a representative engine start event.

Referring to FIG. 3, the method 100 according to an example embodiment commences at step 102 with the engine 20 of FIG. 1 in an on/running state. The method 100 proceeds to step 104 with the engine 20 running.

Step 104 includes determining whether auto-stop of the engine 20 has been enabled. For instance, the controller 50 may determine, via its internal logic, whether operating conditions call for stopping the engine 20, e.g., when a vehicle having the powertrain 10 of FIG. 1 is at a stop light or otherwise idling. Step 104 is repeated until a determination by the controller 50 is made that auto-stop is enabled, at which point the controller 50 proceeds to step 106.

Step 106 includes comparing engine speed ($N_{20}$) to a calibrated threshold speed ($N_1$). The method 100 proceeds to step 108 when engine speed is less than the calibrated threshold speed. i.e., $N_{20}<N_1$. Otherwise, the controller 50 repeats step 104.

At step 108, with engine speed below the calibrated threshold speed at step 106, the controller 50 enables the pinion solenoid device 21, as indicated by bit flag 63 of FIG. 2. The method 100 then proceeds to step 110.

At step 110, the controller 50 commands the solenoid current, $I_C$, for the pinion solenoid device 21 to the peak current level $I_P$, i.e., $I_C=I_P$, as shown via trace 66 of FIG. 2. Such a current may be attained responsive to the pinion solenoid control signal 56 of FIG. 1. The method 100 then proceeds to step 112.

Step 112 includes initiating a counter (T) of the controller 50 and waiting for a calibrated duration of delay (T1), with T1 being a predetermined duration suitable for allowing the pinion gear 33 to overcome friction and start to move, with the ultimate goal of achieving contact between the pinion gear 33 and the flywheel 32, i.e., achievement of the pre-engaged state. The method 100 proceeds from step 112 to step 114 when T>T1.

At step 114, the controller 50 next sets the control current, $I_C$, for the pinion solenoid device 21 to a lower holding current level $I_H$, i.e., $I_C=I_H$, as shown at t2 of trace 66 in FIG. 2. The holding current ($I_H$) may be substantially less than the peak current ($I_P$) in certain applications. For instance, the peak current ($I_P$) may be as high as about 15-20 A in an example auxiliary voltage embodiment, while the required holding current ($I_H$) in such an embodiment being as low as about 3-4 A, or about 20 percent of the peak current ($I_P$), with the term "about" as used in describing this particular embodiment meaning to within ±10 percent. Such reduction in current ensures low power dissipation in internal coils of the pinion solenoid device 21 whenever the pinion gear 33 is fully engaged with the flywheel 32. The method 100 then proceeds to step 116.

Step 116 includes checking if the has stopped, i.e. engine speed ($N_{20}$) equal to zero. The method 100 proceeds to step 118 when engine speed is less than the calibrated threshold speed, i.e., $N_{20}=0$. Otherwise, the controller 50 repeats step 116.

Step 118 includes enabling the starter motor 18 of FIG. 1 to rotate the engine crankshaft 31 to a predetermined crank angle suitable for fully and smoothly meshing the gear system 11, the pinion gear 33, and the flywheel 32. Steps 108-114 thus result in translation of the pinion gear 33 to the position indicated at 33A of FIG. 1. Additionally, the predetermined crank angle is selected to place the engine crank angle in a position where the time that is required to restart the engine at the beginning of the next engine start event is at a reduced value. By way of non-limiting example, the predetermined crank angle for a V8 engine may be in a range of 68 degrees before top dead center (BTDC) to 88 degrees BTDC, with a preferred crank angle of about 78 degrees BTDC. In an exemplary embodiment, the movement of the starter motor in step 118 is achieved by PWM drive to the starter motor 18 provided by the motor driver circuit 18D in FIG. 1 as depicted in voltage trace 64A in FIG. 2, with a PWM signal provided as the motor command signal 44. The method 100 then proceeds to step 116.

Step 120 includes determining whether auto-start of the engine 20 has been enabled. The method 100 proceeds to step 122 when auto-start is enabled, repeating step 120 until enablement has been determined.

Step 122 includes commanding the starter motor 18, via the motor solenoid control signal 17 of FIG. 1, to crank the engine 20 to a threshold starting speed, where the engine can be fueled and fired to sustain running. Step 122 may include commanding the motor torque (arrow $T_M$) of FIG. 1 at a level sufficient for rotating the crankshaft 31. The method 100 then proceeds to step 124.

At step 124, the controller 50 determines if the auto-start event is complete, a state that is achieved when engine speed ($N_{20}$) exceeds a threshold speed, e.g., an idle speed of 600 RPM, for a predetermined duration such as 200 ms indicative of auto-start being complete. The method 100 proceeds to step 126 when the engine 20 has successfully started.

Step 126 includes removing the supply voltage to the starter motor 18 by way of controlling the motor solenoid control signal 17 of FIG. 1. Step 126 also includes disabling the engagement of the pinion gear 33 via the pinion solenoid control signal 56 of FIG. 1. The pinion solenoid device 21, in response to corresponding control signals from the controller 50, translates the pinion gear 33 out of engagement with the gear system 11 and flywheel 32. The method 100 then proceeds to step 128.

At step 128 the restart is complete, and the method 100 returns to step 102 for a subsequent auto-stop event.

The method 100 may therefore be used advantageously within the context of the example powertrain 10 of FIG. 1 to improve the NVH performance of an engine start/stop system using the example starter motor 18 described herein, particularly in a single-pinion drive solenoid system powered via PWM signals over a low-voltage power network and/or during change-of-mind starts in which an operator terminates an auto-stop sequence of the engine 20 prior to the engine 20 fully stopping. Alternative partitioning of functions different from the architecture shown in FIG. 1 are also within the scope of the present disclosure. For example, it is envisioned that the PWM drive circuits 18D and 21D for the motor 18 and the pinion solenoid device 21 may be integrated into the starter motor 18 and use appropriate commands for pre-engaging the pinion gear 33 and controlled rotation of the starter motor 18 via CAN bus 35 or other communication channel, or via discrete signals between the controller 50 and the starter motor 18. Alternatively, the PWM drive circuits 18D and 21D for the motor 18 and the pinion solenoid device 21 may be integrated into the controller 50, or into a battery fuse distribution unit (not shown). Such benefits and other possible benefits will be apparent to one of ordinary skill in the art in view of the present disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electric starter system for an internal combustion engine having a flywheel with a flywheel gear, the flywheel connected to an engine crankshaft, the electric starter system comprising:
    a pinion gear;
    a pinion solenoid device coupled to the pinion gear;
    a starter motor that is selectively connectable to the flywheel of the engine via the pinion gear; and
    a controller in communication with the pinion solenoid device and the starter motor, the controller being configured to:
    in response to an engine auto-stop signal:
    command the engine to turn off;
    determine an engine speed of the engine after being turned off;
    command, in response to the engine speed being less than a first threshold speed, a control current be delivered to the pinion solenoid device at a peak current level to thereby translate the pinion gear into contact with the flywheel and the motor;
    command, in response to the engine speed being less than a second threshold speed, pulse width modulation (PWM) excitation to the starter motor to cause rotation of the starter motor to thereby fully engage the pinion gear with the flywheel and to cause rotation of the engine crankshaft to a predetermined crank angle;
    cease supplying PWM excitation to the starter motor when the engine crankshaft has reached the predetermined crank angle;
    transmit pulse width modulation (PWM) pinion control signals at varying voltages to deliver the control current to the pinion solenoid device at a fluctuating holding current level after the pinion gear is fully engaged with the flywheel, the holding current level being a non-zero value less than the peak current level; and
    in response to an engine auto-start signal:
    command delivery of motor torque from the starter motor, through the pinion gear, and to the flywheel while maintaining the control current at the holding current level for a duration sufficient for starting the engine.

2. The electric starter system of claim 1 comprising two independently controllable devices for delivering current to the starter motor.

3. The electric starter system of claim 2, wherein one of the two independently controllable devices for delivering current to the starter motor comprises a motor solenoid, and the other of the two independently controllable devices for delivering current to the starter motor comprises a semiconductor switching device.

4. The electric starter system of claim 3, wherein the pulse width modulation (PWM) excitation to the starter motor is supplied by the semiconductor switching device.

5. The electrical starter system of claim 3, wherein excitation to the starter motor to deliver motor torque from the starter motor, through the pinion gear, and to the flywheel while maintaining the control current at the holding current level for a duration sufficient for starting the engine is supplied by the motor solenoid.

6. The electric starter system of claim 1, wherein the pinion solenoid device and the starter motor are powered via an auxiliary voltage bus having a nominal voltage level of 15V or less.

7. A method for controlling an electric starter system for an internal combustion engine having a flywheel connected to an engine crankshaft, the method comprising:
commanding, responsive to an engine auto-stop signal, the engine to turn off;
determining, via a controller, when an engine speed of the engine is less than a first threshold speed;
commanding, responsive to the engine speed being less than the first threshold speed, delivery of a control current to a pinion solenoid device via the controller at a peak current level to thereby translate a pinion gear connected to the pinion solenoid device into contact with the flywheel;
commanding, responsive to the engine speed less than a second threshold speed, rotation of a starter motor to thereby fully engage the pinion gear with the flywheel and to rotate the engine crankshaft to a predetermined crank angle;
transmitting pulse width modulation (PWM) pinion control signals at varying voltages to deliver the control current to the pinion solenoid device at a fluctuating holding current level, that is a non-zero value less than the peak current level, after the pinion gear is fully engaged with the flywheel;
commanding via the controller, responsive to an engine auto-start signal, delivery of motor torque from the starter motor, through the pinion gear, and to the flywheel while maintaining the control current at the holding current level;
and maintaining the motor torque via the controller for a duration sufficient for starting the engine.

8. The method of claim 7, wherein the electric starter system comprises two independently controllable devices for delivering current to the starter motor.

9. The method of claim 8, wherein one of the two independently controllable devices for delivering current to the starter motor comprises a motor solenoid, and the other of the two independently controllable devices for delivering current to the starter motor comprises a semiconductor switching device.

10. The method of claim 9, wherein the pulse width modulation (PWM) excitation to the starter motor is supplied by the semiconductor switching device.

11. The method of claim 9, wherein excitation to the starter motor to deliver motor torque from the starter motor, through the pinion gear, and to the flywheel while maintaining the control current at the holding current level for a duration sufficient for starting the engine is supplied by the motor solenoid.

12. The method of claim 7, wherein the pinion solenoid device and the starter motor are powered via an auxiliary voltage bus having a nominal voltage level of 15V or less.

13. A powertrain comprising;
an internal combustion engine having a flywheel with a flywheel gear,
the engine having a crankshaft connected to the flywheel;
a transmission connected to the engine;
a load coupled to the transmission;
a power source configured to output electric current;
a pinion gear;
a pinion solenoid device coupled to the pinion gear and configured to activate in response to electric current from the power source to thereby move the pinion gear into meshing contact with the flywheel gear of the flywheel;
a starter motor with a motor gear that is selectively connectable to the flywheel gear of the flywheel of the engine via the pinion gear by activating the pinion solenoid device; and
a controller in communication with the pinion solenoid device and the starter motor, the controller being configured to:
in response to an engine auto-stop signal, command the engine to turn off;
determine an engine speed of the engine after being turned off;
command, in response to the engine speed being less than a first threshold speed, a control current be delivered to the pinion solenoid device at a peak current level to thereby translate the pinion gear into contact with the flywheel and the motor;
command, in response to a predetermined delay time having elapsed after beginning the delivery of the control current to the pinion solenoid device at the peak current level, pulse width modulation (PWM) pinion solenoid control signals at varying voltages to deliver the control current to the pinion solenoid device at a fluctuating holding current level, the holding current level being a non-zero value less than the peak current level,
command, in response to the engine speed being less than a second threshold speed, pulse width modulation (PWM) motor control signals be delivered to the starter motor to cause rotation of the starter motor to thereby fully engage the pinion gear with the flywheel and to cause rotation of the engine crankshaft to a predetermined crank angle;
cease transmitting PWM motor control signals to the starter motor when the engine crankshaft has reached the predetermined crank angle; and
in response to an engine auto-start signal:
command delivery of motor torque from the starter motor, through the pinion gear, and to the flywheel while maintaining the control current at the holding current level for a duration sufficient for starting the engine.

14. The powertrain of claim 13 comprising two independently controllable devices for delivering current to the starter motor.

15. The powertrain of claim 14, wherein one of the two independently controllable devices for delivering current to the starter motor comprises a motor solenoid, and the other of the two independently controllable devices for delivering current to the starter motor comprises a semiconductor switching device.

16. The powertrain of claim 15, wherein the pulse width modulation (PWM) excitation to the starter motor is supplied by the semiconductor switching device.

17. The powertrain of claim 15, wherein excitation to the starter motor to deliver motor torque from the starter motor, through the pinion gear, and to the flywheel while maintaining the control current at the holding current level for a duration sufficient for starting the engine is supplied by the motor solenoid.

18. The powertrain of claim 13, wherein the pinion solenoid device and the starter motor are powered via an auxiliary voltage bus having a nominal voltage level of 15V or less.

19. The powertrain of claim 13, wherein the PWM pinion solenoid control signals and the PWM motor control signals are generated by circuits that are physically integrated with the starter motor.

20. The powertrain of claim 13, wherein the PWM pinion solenoid control signals and the PWM motor control signals are generated by circuits that are physically integrated with the controller or with a battery fuse distribution unit.

* * * * *